US008679371B2

(12) United States Patent
Li et al.

(10) Patent No.: US 8,679,371 B2
(45) Date of Patent: Mar. 25, 2014

(54) ELECTRICALLY CONDUCTING POLYMERIC COMPOSITIONS, METHODS OF MANUFACTURE THEREOF AND ARTICLES COMPRISING THE SAME

(75) Inventors: Gang Li, Shanghai (CN); Xiangping Zou, Shuanghai (CN); Sanjay Gurbasappa Charati, Bangalore (IN); Soumyadeb Ghosh, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 691 days.

(21) Appl. No.: 11/841,408

(22) Filed: Aug. 20, 2007

(65) Prior Publication Data

US 2008/0251769 A1 Oct. 16, 2008

Related U.S. Application Data

(60) Provisional application No. 60/911,238, filed on Apr. 11, 2007.

(51) Int. Cl.
*H01B 1/22* (2006.01)
*H01B 1/02* (2006.01)

(52) U.S. Cl.
USPC .............................. 252/512; 252/513; 252/514

(58) Field of Classification Search
USPC .............................................. 252/500–521.6
See application file for complete search history.

(56) References Cited

U.S. PATENT DOCUMENTS

| | | | | |
|---|---|---|---|---|
| 4,474,685 A | * | 10/1984 | Annis | 252/503 |
| 4,566,990 A | * | 1/1986 | Liu et al. | 252/503 |
| 4,610,808 A | * | 9/1986 | Kleiner | 252/512 |
| 5,034,157 A | * | 7/1991 | Merrell et al. | 252/512 |
| 5,248,553 A | * | 9/1993 | Miyashita et al. | 428/297.1 |
| 5,371,134 A | * | 12/1994 | Inoue | 524/495 |
| 5,399,295 A | * | 3/1995 | Gamble et al. | 252/511 |
| 5,736,603 A | * | 4/1998 | Pfeiffer et al. | 524/495 |
| 5,932,353 A | * | 8/1999 | Huarng et al. | 428/423.5 |
| 6,896,828 B2 | * | 5/2005 | Fox et al. | 252/512 |
| 7,022,265 B2 | * | 4/2006 | Cheng et al. | 252/506 |

FOREIGN PATENT DOCUMENTS

| | | |
|---|---|---|
| EP | 0176866 A2 | 4/1986 |
| EP | 0176886 A3 | 4/1986 |
| EP | 0176866 B1 | 12/1990 |
| EP | 0874024 A1 | 10/1998 |
| EP | 0874024 B1 | 5/2008 |
| WO | 9304119 | 3/1993 |
| WO | 9304119 A1 | 3/1993 |

OTHER PUBLICATIONS

International Search Report dated Mar. 17, 2009 for App. # PCT IB2008/051367.

* cited by examiner

*Primary Examiner* — Mark Kopec
*Assistant Examiner* — Jaison Thomas
(74) *Attorney, Agent, or Firm* — Cantor Colburn LLP

(57) ABSTRACT

Disclosed herein too is a method of manufacturing an electrically conducting polymeric composition comprising blending an organic polymer composition that comprises a thermoplastic organic polymer; an electrically conducting filler composition that comprises metal fibers; and an electrically insulating composition in an extruder; wherein the electrically insulating composition is fed into the extruder downstream of the location at which the organic polymer composition is fed into the extruder and wherein the electrically conducting filler composition is fed into the extruder at a location downstream of the location at which the electrically insulating composition is fed into the extruder.

17 Claims, No Drawings

ELECTRICALLY CONDUCTING POLYMERIC COMPOSITIONS, METHODS OF MANUFACTURE THEREOF AND ARTICLES COMPRISING THE SAME

CROSS-REFERENCE TO RELATED APPLICATIONS

This application is related to provisional application No. 60/911,238, filed on Apr. 11, 2007 the entire contents of which are hereby incorporated by reference.

BACKGROUND

This disclosure relates to electrically conducting polymeric compositions, methods of manufacture thereof and articles comprising the same.

Electronic products emit electromagnetic radiation that can adversely affect the performance of other electrical products located in the vicinity of these products. It is therefore desirable to shield electronic products, such as computers, word processors, display screens, mobile phones, DVD players, digital cameras, household appliances, or the like, from emitted electromagnetic radiation.

Metal coatings have been used to shield electronic products and users from electromagnetic radiation. Metal coatings are not very flexible, cannot be easily manufactured and are therefore impractical for many applications. Furthermore, metal coatings can be expensive, making their use economically impractical or undesirable.

Polymeric compositions that provide electromagnetic shielding are commercially available but these compositions usually contain large amounts of electrically conductive fillers. The incorporation of large amounts of electrically conductive fillers generally reduces the ease of processability of such polymeric compositions. Large amounts of electrically conductive fillers also reduce impact strength.

In addition, the use of large amounts of electrically conductive fillers is detrimental to mechanical properties of the polymeric composition. For example, as the amount of the electrically conductive filler is increased, the tensile elastic modulus increases, but this is generally accompanied by a decrease in the ductility.

It is therefore desirable to have an electrically conducting polymeric composition that provides effective electromagnetic shielding, that is flexible, is easy to manufacture, and maintains good mechanical strength and processability.

SUMMARY

Disclosed herein is an electrically conducting polymeric composition comprising an organic polymer composition that comprises a thermoplastic organic polymer; an electrically conducting filler composition that comprises metal fibers, metal coated fibers, or a combination comprising at least one of the foregoing metal fibers and metal coated fibers; and an electrically insulating composition; wherein the electrically conducting polymeric composition has a flexural modulus of greater than or equal to about 4 gigapascals and a melt flow index of about 5 to about 100 when measured under a load of 10 kg-f/cm$^2$.

Disclosed herein too is a method of manufacturing an electrically conducting polymeric composition comprising blending an organic polymer composition that comprises a thermoplastic organic polymer; an electrically conducting filler composition that comprises metal fibers, metal coated fibers, or a combination comprising at least one of the foregoing metal fibers and metal coated fibers; and an electrically insulating composition in an extruder; wherein the electrically insulating composition is fed into the extruder downstream of the location at which the organic polymer composition is fed into the extruder and wherein the electrically conducting filler composition is fed into the extruder at a location downstream of the location at which the electrically insulating composition is fed into the extruder.

DETAILED DESCRIPTION

Disclosed herein is an electrically conducting polymeric composition that comprises a thermoplastic organic polymer composition, an electrically conducting filler composition and an electrically insulating composition. The electrically conducting organic polymer composition can be advantageously processed in commercially available processing devices such as extruders or injection-molding machines. In addition to being easily processable, the resulting electrically conducting polymeric composition has a uniformly dispersed electrically conducting filler composition that can provide electromagnetic shielding at values of greater than or equal to about 20 decibels (dB).

The organic polymer composition comprises thermoplastic polymers. The organic polymer composition comprises a thermoplastic semi-crystalline polymer, an amorphous polymer or a blend of a semi-crystalline polymer with an amorphous polymer. Blends of thermoplastic polymers or blends of thermoplastic polymers with thermosetting polymers may be used. The organic polymer composition can comprise a homopolymer, a copolymer such as a star block copolymer, a graft copolymer, an alternating block copolymer or a random copolymer, an ionomer, a dendrimer, or a combination comprising at least one of the foregoing types of organic polymers.

Examples of organic polymers that can be used in the electrically conducting polymeric composition include polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyethylene terephthalate, polybutylene terephthalate, polyurethane, polytetrafluoroethylene, fluorinated ethylene propylene, perfluoroalkoxyethylene, polychlorotrifluoroethylene, polyvinylidene fluoride, or the like, or a combination comprising at least one of the foregoing organic polymers.

Suitable examples of blends of organic polymers that can be used in the electrically conducting polymeric composition include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, nylon/elastomers, polyester/elastomers, polyethylene terephthalate/polybutylene terephthalate, acetal/elastomer, styrene-maleicanhydride/acrylonitrile-butadiene-styrene, polyether etherketone/ polyethersulfone, polyether etherketone/polyetherimide polyethylene/nylon, polyethylene/polyacetal, or the like.

In one embodiment, the organic polymeric composition is used in an amount of about 5 to about 70 weight percent (wt %), specifically about 10 to about 65 wt %, more specifically 15 to about 60 wt %, and even more specifically about 20 to about 55 wt % of the total weight of the electrically conducting polymeric composition.

The electrically conducting filler composition comprises metal fibers or metal coated fibers. The metal fibers can comprise stainless steel fibers, aluminum fibers, copper fibers, nickel fibers, aluminum alloy fibers, copper alloy fibers, or the like, or a combination comprising at least one of the foregoing fibers. The metal fibers are generally in the form of bundles. An exemplary metal fiber is a stainless steel fiber present in a bundle of about 10,000 fibers commercially available from Bekaert. The bundle is coated with a layer (a jacket) of organic polymer.

Metal coated fibers generally comprise electrically insulating fibers that are coated with an electrically conducting metal. Electrically conducting fibers may also be coated with a metallic layer. A list of electrically insulating fibrous materials is provided below. These electrically insulating fibrous materials may be coated with metals such as copper, aluminum, iron, nickel, cobalt, tin, zinc, gold, silver, platinum, palladium, or the like, or a combination comprising at least one of the foregoing metals.

In one embodiment, the electrically conducting polymeric composition comprises metal fibers or metal coated fibers having diameters of about 0.5 to about 12 micrometers, specifically about 3 to about 9 micrometers, more specifically about 4 to about 9 micrometers. An exemplary diameter is 8 micrometers.

In another embodiment, the electrically conducting polymeric composition comprises metal fibers or metal coated fibers having average lengths of about 0.5 to about 12 millimeters prior to processing, specifically about 3 to about 11 millimeters prior to processing, more specifically about 5 to about 10 millimeters prior to processing.

In another embodiment, the electrically conducting polymeric composition comprises metal fibers or metal coated fibers having average lengths of about 0.1 to about 3 millimeters after undergoing processing in an extruder, specifically about 0.3 to about 1.5 millimeters after undergoing processing in an extruder, more specifically about 0.5 to about 1 millimeters after undergoing processing in an extruder and the composition is injection molded into plate having a thickness of 3 millimeters.

In yet another embodiment, the electrically conducting filler composition is used in an amount of about 3 to about 30 wt %, specifically about 4 to about 28 wt %, more specifically about 5 to about 25 wt %, and even more specifically about 7 to about 20 wt % of the total weight of the electrically conducting polymeric composition. An exemplary amount of the electrically conducting filler composition is about 15 wt % of the total weight of the electrically conducting polymeric composition.

The electrically insulating composition generally improves the flexural modulus as well as the processability of the electrically conducting polymeric composition. The electrically insulating composition generally comprises materials that are electrically insulating and have an electrical resistivity that is greater than or equal to about $10^{12}$ ohm-cm. The electrically insulating composition may be fibrous or non-fibrous. In an exemplary embodiment, the electrically insulating composition is fibrous. The electrically insulating composition when combined with the electrically conducting filler composition demonstrates a synergy that results in improved electromagnetic radiation shielding properties. In one embodiment, the synergy between the electrically insulating composition and the electrically conducting filler composition produces an electrically conducting filler composition that has improved electrical conductivity, improved electromagnetic radiation shielding properties and an improved flexural modulus than a comparative composition that does not contain the electrically insulating composition.

As used herein, "fibrous" electrically insulating fillers may exist in the form of whiskers, needles, rods, tubes, strands, elongated platelets, lamellar platelets, ellipsoids, micro fibers, nanofibers and nanotubes, elongated fullerenes, or the like, or a combination comprising at least one of the foregoing. It is generally desirable for the fibrous electrically insulating fillers to have an average aspect ratio of greater than or equal to about 1. Where such fibrous fillers exist in aggregate form, an aggregate having an average aspect ratio greater than 1 will also suffice. Examples of suitable fibrous fillers include short inorganic fibers, including processed mineral fibers such as those derived from blends comprising at least one of aluminum silicates, aluminum oxides, magnesium oxides, and calcium sulfate hemihydrate, boron fibers, ceramic fibers such as silicon carbide, and fibers from mixed oxides of aluminum, boron and silicon sold under the trade name NEXTEL® by 3M Co., St. Paul, Minn., USA. Also included among fibrous fillers are single crystal fibers or "whiskers" including silicon carbide, alumina, boron carbide, or the like, or a combination comprising at least one of the foregoing fibrous fillers. Fibrous fillers such as glass fibers, basalt fibers, including textile glass fibers and quartz may also be included.

The fibrous fillers may be provided in the form of monofilament or multifilament fibers and can be used either alone or in combination with other types of fiber, through, for example, co-weaving or core/sheath, side-by-side, orange-type or matrix and fibril constructions. Exemplary cowoven structures include glass fiber-aromatic polyimide (aramid) fiber and aromatic polyimide fiber-glass fiber. Fibrous fillers may be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, preforms and braids.

Exemplary electrically insulating fillers are glass fibers. Useful glass fibers can be formed from any type of fiberizable glass composition and include those prepared from commercial fiberizable glass compositions known as "E-glass," "A-glass," "C-glass," "D-glass," "R-glass," "S-glass," as well as E-glass derivatives that are fluorine-free and/or boron-free. Most reinforcement mats comprise glass fibers formed from E-glass and are included in the conductive compositions of this invention.

Commercially available glass fibers generally having nominal filament diameters of about 4.0 to about 35.0 micrometers, and most E-glass fibers having nominal filament diameters of about 9.0 to about 30.0 micrometers may be included in the electrically conducting polymeric composition. The filaments are made by standard processes, e.g., by steam or air blowing, flame blowing, and mechanical pulling. The preferred filaments for plastics reinforcement are made by mechanical pulling. Use of non-round fiber cross section is also possible.

The glass fibers may be sized or unsized. Sized glass fibers are generally coated on at least a portion of their surfaces with a sizing composition selected for compatibility with the polymeric matrix material. The sizing composition facilitates wetout and wet-through of the matrix material upon the fiber strands and assists in attaining desired physical properties in the composite.

The amount of sizing employed is generally that amount which is sufficient to bind the glass filaments into a continuous strand and ranges from about 0.1 to about 5 wt %, specifically from about 0.1 to 2 wt % based on the weight of the glass fibers.

As noted above, the electrically insulating composition can comprise non-fibrous fillers. Non-fibrous fillers generally have average aspect ratios of about 1. Suitable examples of non-fibrous fillers are talc, mica, clays, glass beads, metal oxides such as, for example, titanium dioxide, aluminum oxide, zinc oxide, zirconium oxide, cerium oxide, silicon dioxide; silicon carbide, silicon nitride, or the like, or a combination comprising at least one of the foregoing fillers.

In one embodiment, in one method of manufacturing the electrically conducting polymeric composition the organic polymer composition, the electrically conducting filler composition and the electrically insulating composition are blended together. The blending can include dry blending, melt blending, solution blending or a combination comprising at least one of the foregoing forms of blending.

Melt blending of the electrically conducting polymeric composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Melt blending involving the aforementioned forces may be conducted in machines such as single or multiple screw extruders, Buss kneader, Henschel, helicones, Ross mixer, Banbury, roll mills, molding machines such as injection molding machines, vacuum forming machines, blow molding machine, or then like, or combinations comprising at least one of the foregoing machines.

When the melt blending is conducted on a twin screw extruder, the screw speed of the extruder is generally selected to be greater than or equal to about 125 revolutions per minute (rpm), specifically greater than or equal to about 150 rpm, more specifically greater than or equal to about 175 rpm, and even more specifically greater than or equal to about 200 rpm.

In one embodiment, in one method of manufacturing the electrically conducting polymeric composition, the organic polymer composition is fed to the throat of the extruder, while the electrically conducting filler composition and the electrically insulating composition are fed into the extruder downstream from the throat. In another embodiment, the organic polymer composition is fed to the throat of the extruder, while the electrically insulating composition is fed into the extruder via a first port located downstream from the throat and the electrically conducting filler composition is fed into the extruder via a second port located further downstream from the first port.

In one embodiment, the first port is the second port. In other words, first port and the second port are the located at identical locations on the extruder. In another embodiment, the first port and the second port are located at the same distance from the throat of the extruder but on opposing sides of the extruder barrel.

In an exemplary embodiment, the organic polymer composition is fed to the throat of the extruder, while the electrically insulating composition is fed into the extruder via a first port located downstream from the throat and the electrically conducting filler composition is fed into the extruder via a second port located further downstream from the first port but just prior to the die of the extruder. In using this method of extrusion, the wetting of the electrically conducting filler composition by the organic polymer composition takes place with a minimum of damage to the electrically conducting filler composition. In using this method of extrusion, the aspect ratio of the electrically conducting filler composition is preserved.

In one embodiment, the electrically conducting filler composition is subjected to a shear rate of about 40 to about 500 seconds$^{-1}$ (s$^{-1}$), specifically about 45 to about 200 s$^{-1}$, and more specifically about 50 to about 100 s$^{-1}$, during the manufacturing of the electrically conducting polymeric composition. An exemplary amount of shear rate that the electrically conducting filler composition can be subjected is about 68 s$^{-1}$.

In yet another embodiment, either the electrically conducting filler composition or the electrically insulating composition or both the electrically conducting filler composition or the electrically insulating composition can be added to the extruder in the form of a masterbatch.

The extrudate from the extruder is cooled and pelletized. The pellets may be subjected to molding in an injection molding machine if desired. Other part forming methods, such as compression molding, thermoforming, extrusion, blow-molding, vacuum forming may also be used.

As noted above, the electrically conducting polymeric composition comprising the organic polymeric composition, the electrically conducting filler composition and the electrically insulating composition can have a bulk volume electrical resistivity less than or equal to about 10 e$^8$ ohm-cm, specifically less than or equal to about 10 e$^5$ ohm-cm and even more specifically less than or equal to about 10 e$^3$ ohm-cm.

In one embodiment, the electrically conducting polymeric composition having a thickness of about 1 to about 5 millimeters can shield against electromagnetic radiation in an amount of greater than or equal to about 25 decibels (dB), specifically greater than or equal to about 45 dB and more specifically greater than or equal to about 80 dB.

The electrically conducting polymeric composition has a flexural modulus of greater than or equal to about 4 gigapascals (GPa), specifically greater than or equal to about 4.5 GPa, specifically greater than or equal to about 5 GPa, and more specifically greater than or equal to about 6 GPa.

In one exemplary embodiment, the electrically conducting polymeric composition has a melt flow index of 5 to about 100 when measured at a temperature of about 150° C. to about 400° C. under a load of 10 kg-f/cm$^2$, specifically about 20 to about 90 at a temperature of about 175° C. to about 375° C. under a load of 10 kg-f/cm$^2$, and more specifically about 30 to about 70 at a temperature of about 200° C. to about 350° C. under a load of 10 kg-f/cm$^2$.

In an exemplary embodiment, the addition of an electrically insulating composition comprising glass fibers to an electrically conducting filler composition comprising stainless steel fibers increases the electromagnetic shielding of the electrically conducting polymeric compositions over compositions that contain only the stainless steel fibers. Despite the fact that the glass fibers are electrically insulating, there exists a synergy between the glass fibers and the stainless steel fibers that improves the EMI shielding efficiency of the composition over a composition that contains an equivalent amount of only steel fibers.

The addition of the glass fibers to the composition improves the melt flow and increases the melt strength of the electrically conducting polymeric composition. The increase in the melt strength makes the composition more readily extrudable, thereby reducing processing costs. The glass fibers also facilitate an improved networking of the stainless steel fibers thereby the electromagnetic shielding capabilities of the electrically conducting polymeric composition. The addition of the glass fiber also improves the elastic modulus of the electrically conducting polymeric composition.

The following examples, which are meant to be exemplary, not limiting, illustrate compositions and methods of manufacturing of some of the various embodiments described herein.

EXAMPLES

Example 1

The following examples were performed to demonstrate the shielding effect and the impact properties of selected electrically conducting polymeric compositions. In this example, the electrically conducting polymeric compositions were manufactured by blending together an electrically conducting filler composition that contains stainless steel fibers (SSF) and an electrically insulating composition that contains glass fibers (GF) with a thermoplastic semi-crystalline polymer. As can be seen in the Table 1, the organic polymer was either polyphenylene sulfide (PPS), polyamide (nylon 6) (PA6) or polybutylene terephthalate (PBT). The glass fibers used were PPG35401/8 from PPG Industries for the electrically conducting polymeric compositions containing PPS and PA6; 183H-14P, VCE2 glass fibers from Owens Corning were used in the electrically conducting polymeric compositions containing PBT. The stainless steel fibers used in the electrically conducting polymeric compositions were Bekishield S3010 GR75 commercially available from the Bekaert Group.

The organic polymer, stainless steel fibers and glass fibers were extruded in a Toshiba TEM-37Bs twin screw extruder. The extruder screw had a diameter of 37 millimeters and a length to diameter ratio of 40. The extruder was operated at 140 revolutions per minute.

The organic polymer was fed into the throat of the extruder, while the fibers were fed into the extruder via a side feeder at downstream.

Following extrusion, the strand of the electrically conducting polymeric composition emanating from the extruder was quenched immediately and chopped into pellets. The pellets were injection molded in an injection molding. Injection molding was conducted in an ES3000 injection molding machine. The screw speed during injection was 60 rpm. The maximum injection pressure was 800 kilogram-force per square centimeter (kgf/cm$^2$). The mold temperature was 80° C., while the nozzle temperature was 285° C. The barrel temperature was set between 270° C. for zone 1, 280° C. for zone 2 and 290° C. for zone 3.

The compositions and results are shown in the Table 1. In Table 1, the polymer constitutes the remainder of the composition. The EMI shielding effect test was conducted according to ASTM D4935.

TABLE 1

| Sample # | Polymer* | GF (wt %) | SSF (wt %) | EMI shielding (dB) | Processability |
|---|---|---|---|---|---|
| 1 | PPS | 0 | 7.5 | 19 | Stable strand; no breaks |
| 2 | | 10 | | 25 | Stable strand; no breaks |
| 3 | | 15 | | 35 | Stable strand; no breaks |
| 4 | | 20 | | 24 | Stable strand; no breaks |
| 5 | | 30 | | 27 | Stable strand; no breaks |
| 6 | | 0 | 15 | 34 | Cannot get a stable strand; always breaks; no jamming |
| 7 | | 10 | | 43 | Stable strand; no breaks |
| 8 | | 15 | | 52 | Stable strand; no breaks |
| 9 | | 20 | | 51 | Stable strand; no breaks |
| 10 | | 30 | | 41 | Stable strand; no breaks |
| 11 | | 0 | 20 | 56 | Cannot be compounded at all; jammed the die right after compounding started |
| 12 | | 10 | | 62 | Stable strand; no breaks |
| 13 | | 15 | | 61 | Stable strand; no breaks |
| 14 | | 20 | | 57 | A couple of breaks happened during extrusion. |
| 15 | | 30 | | 45 | A couple of breaks happened during extrusion. |
| 16 | PA6 | 0 | 15 | 41 | Stable strand; no breaks |
| 17 | | 15 | 15 | 56 | Stable strand; no breaks |
| 18 | | 0 | 20 | 51 | Stable strand; no breaks |
| 19 | | 15 | 20 | 60 | Stable strand; no breaks |
| 20 | PBT | 0 | 10 | 29 | Few breaks |
| 21 | | 15 | 10 | 47 | No breaks |
| 22 | | 0 | 15 | 38 | Always breaks; jammed two holes of the die during compounding |
| 23 | | 15 | 15 | 50 | No breaks; no jamming |
| 24 | | 0 | 20 | 46 | Always breaks; jammed all four holes of the die during compounding |
| 25 | | 15 | 20 | 51 | A few breaks; no jamming |

*The polymer constitutes the remainder of the composition.

As shown in Table 1, the compositions containing both stainless steel fiber (5 to 20 wt %) and glass fiber (0 to 30 wt %) show a marked improvement in the electromagnetic shielding and processability properties when compared with those compositions that contain only stainless steel fibers. In the case of the electrically conducting polymeric compositions containing PPS and 15 wt % stainless steel (with no glass fibers), the process is unstable and the strands coming out of the extruder tended to break easily. The electromagnetic interference (EMI) shielding effect could only reach 34 dB. However, when the amount of the stainless steel fiber was kept constant, and 15 wt % or 20 wt % glass fiber was added to the electrically conducting polymeric composition, the process is significantly improved with no breakage of strands occurring during the process while the EMI shielding effect reached 52 dB and 51 dB respectively. When 30 wt % glass fiber was added to the electrically conducting polymeric composition, the process for extruding the pellets occurred without any breaks in the strands and an EMI shielding effect of 41 dB was achieved.

At 20 wt % stainless steel fiber loadings in a PPS resin, compounding of the electrically conducting polymeric composite could not be carried out due to jamming of the die during extrusion. But when 10 wt % of glass fiber was added (see Sample No. 12), the process was very stable and an effective shielding of 62 dB was achieved in the electrically conducting polymeric composition.

The improved processability with decrease in strand breakage was attributed to increased melt viscosity of the compositions containing the glass fibers. Similar results can be seen for the electrically conducting polymeric compositions containing the polyamide (see Samples Nos. 16-19) and the polybutylene terephthalate (see Samples Nos. 20-25).

Example 2

This set of experiments was conducted to show that the synergistic effects demonstrated in the Example 1 hold good when the glass fibers in the electrically insulating composition was replaced with glass beads. It was also conducted to demonstrate that the synergistic effect between electrically insulating fillers and electrically conducting fillers occurs when amorphous resins were used in lieu of semi-crystalline resins. The organic polymer used was a blend of polycarbonate and acrylonitrile butadiene styrene (PC/ABS). The blend is amorphous. The organic polymer was commercially available from General Electric Advanced Materials.

The compounding was conducted in a manner similar to the Example 1. The organic polymer, stainless steel fibers, glass beads and/or the glass fibers were extruded in a Toshiba TEM-37Bs twin screw extruder. The extruder was operated at 140 revolutions per minute.

The organic polymer was fed into the throat of the extruder, while the fibers and/or the glass beads were fed into the extruder via a side feeder downstream.

Following extrusion, the strand emanating from the extruder was quenched immediately and chopped into pellets. The pellets were injection molded in an injection molding machine as described in Example 1. The compositions and results are shown in the Table 2. In Table 2, the polymer constitutes the remainder of the composition. The EMI shielding effect test was conducted according to ASTM D4935.

TABLE 2

| Sample No. | Polymer* | SSF (wt %) | GF (wt %) | GB (wt %) | EMI shielding (dB) |
|---|---|---|---|---|---|
| 1 | PC/ABS | 9 | 0 | | 25.1 |
| 2 | | 9 | 15 | | 28.6 |
| 3 | | 9 | 0 | 20 | 36 |
| 4 | | 15 | 0 | | 39.4 |
| 5 | | 15 | 15 | | 47.2 |
| 6 | | 15 | | 5 | 51 |

*The polymer constitutes the remainder of the composition.

As shown in Table 2, when only 9 wt % of the stainless steel fiber is added to PC/ABS (see Sample No. 1), the electrically conducting polymeric composition displays an EMI shielding effect of only 25 dB, whereas when 15 wt % of glass fiber was added along with the 9 wt % stainless steel fibers to the electrically conducting polymeric composition (Sample No. 2), the shielding effect is increased to 28 dB. A similar trend was observed when the stainless steel fiber content was increased to 15 wt % (see Sample Nos. 4 and 5).

The synergistic effect was also observed in the electrically conducting polymeric compositions when glass beads (GB) were used in lieu of glass fibers. As shown in the Table 2, when glass beads in an amount of 20 wt % were compounded with 9 wt % stainless steel fiber in PC/ABS, the EMI shielding effect was measured at 36 dB, 10 dB higher than that without the glass beads. In the case of the composition with 5 wt % glass beads and 15 wt % stainless steel fiber (see Sample No. 6), the EMI shielding effect reached 51 dB, 8 units higher than without the glass beads.

Example 3

This set of experiments was conducted to demonstrate that the synergistic effect between the electrically conducting filler and the electrically insulating filler is observed in electrically conducting polymeric compositions that comprise a mixture of crystalline and amorphous polymers. The glass beads and talc were used in addition to the stainless steel fibers as shown in Table 3. The organic polymer used for this example was a blend of polyetherimide (PEI) and nylon 6, 6 (PA66). Polyetherimide is an amorphous polymer, while nylon 6,6 is a semi-crystalline polymer.

The compounding was conducted in a manner similar to the Example 1. The organic polymer, stainless steel fibers, glass beads and glass fibers were extruded in a Toshiba TEM-37Bs twin-screw extruder. The extruder was operated at 140.

The organic polymer was fed into the throat of the extruder, so were the glass beads or the talc. The stainless steel fibers were fed into the extruder via a side feeder at downstream.

Following extrusion, the strand emanating from the extruder was quenched immediately and chopped into pellets. The pellets were injection molded in an injection molding machine. The injection molding was conducted as described in Example 1. The compositions and results are shown in the Table 3. In Table 3, the polymer constitutes the remainder of the composition. The EMI shielding effect test was conducted according to ASTM D4935.

TABLE 3

| Sample No. | Polymer* | SSF (wt %) | Talc (wt %) | GB (wt %) | EMI shielding (dB) |
|---|---|---|---|---|---|
| 1 | PEI/PA66 | 9 | 0 | 0 | 31 |
| 2 | | 9 | 0 | 20 | 40 |
| 3 | | 15 | 0 | 0 | 54 |
| 4 | | 15 | 5 | 0 | 62 |
| 5 | | 15 | 14 | 0 | 60 |

*The polymer constitutes the remainder of the composition.

As shown in Table 3, with 15 wt % of only stainless steel fiber loading, an EMI shielding effect of only 54 dB was obtained while with addition of 5 wt % of talc, the EMI shielding effect can reach 62 dB and at 14 wt % of talc loading, an EMI shielding effect (SE) of 60 dB can be achieved. A similar trend can be observed with the stainless steel-glass bead filler combination at 9 wt % stainless steel fiber loading.

Example 4

This example was conducted to demonstrate that it is advantageous to add the two fibrous fillers, e.g., the stainless steel fibers and the glass fibers, separately to the extruder using two side feeders. As can be seen in the Table 4 below, for the Sample Nos. 3 and 6, the stainless steel fibers were added to the extruder via a feeding port located towards the end of the extruder screw (Feeder 3) whereas the glass fibers were fed to the extruder either through the Feeder 2 setup in between the stainless steel fibers feeder (Feeder 3) and the throat (Feeder 1). For the Sample Nos. 2 and 5, both the glass fibers and the stainless steel fibers were fed to the extruder through Feeder 3.

The organic polymer was an amorphous polymer containing polycarbonate and acrylonitrile butadiene styrene. The organic polymer, stainless steel fibers, glass beads and glass fibers were extruded in a Toshiba TEM-37Bs twin screw extruder. The extruder was operated at 140 revolutions per minute. Injection molding was conducted as described in Example 1. The compositions and results are shown in the Table 4. The EMI shielding effect test was conducted according to ASTM D4935.

TABLE 4

| Sample No. | Polymer* | SSF (wt %) (Feeder 3) | GF (wt %) (Feeder 2) | GF (wt %) (Feeder 3) | EMI shielding (dB) |
|---|---|---|---|---|---|
| 1 | PC/ABS | 9 | 0 | 0 | 25.1 |
| 2 | | 9 | 0 | 15 | 28.6 |
| 3 | | 9 | 15 | 0 | 31.8 |
| 4 | | 15 | 0 | 0 | 39.4 |
| 5 | | 15 | 0 | 15 | 47.2 |
| 6 | | 15 | 15 | 0 | 49.3 |

*The polymer constitutes the remainder of the composition.

From Table 4 it can be seen that when the glass fibers are fed from the Feeder 2, separately from the stainless steel fibers, which is fed from Feeder 3, there is an even greater synergistic enhancement of the EMI shielding effect than when the glass fibers are fed from the same feeder as the stainless steel fibers. Thus, it appears that the main advantage of adding the glass fibers separately, however, is the better dispersion of the fillers.

When the glass fibers and the stainless steel fibers are fed together, the glass filler dispersion was found to be poor. When the glass fibers and the stainless steel fibers are fed together, stainless steel fibers and glass fibers were found to be segregated as separate bundles in the pellets. This leads to poor pellet quality in terms of uneven pellet size as well as in term of filler segregation into separate and isolated domains. This produces uneven product quality and gives rise to downstream manufacturing problems.

From the aforementioned data, it may be seen that there is an increase in the electromagnetic shielding capability of the electrically conducting polymeric composition upon incorporating glass fibers along with stainless steel fibers into the composition. There is an increase of at least 10%, specifically at least 20%, more specifically at least 30% and even more specifically at least 40% in the electromagnetic shielding capability over a composition that does not contain the glass fibers. The electrically conducting polymeric compositions can display an EMI shielding capability that is greater than or equal to about 50 dB, specifically greater than or equal to about 55 dB, and more specifically greater than or equal to about 60 dB.

The electrically conducting polymeric compositions can be advantageously used in electronic applications where electromagnetic shielding is generally desired. Examples are computers, television sets, radios, or the like. The electrically conducting polymeric compositions may also be used in automobiles in components where electromagnetic shielding greater than or equal to about 15 dB are desirable characteristics.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrically conducting polymeric composition comprising:
    an organic polymer composition that comprises a thermoplastic organic polymer; an electrically conducting filler composition that comprises metal fibers, metal coated fibers, or a combination comprising at least one of the foregoing metal fibers and the metal coated fibers; with the aspect ratio of the metal fibers and the metal coated fibers being greater than 1; the electrically conducting filler being present in amounts of about 3 to 30 wt %, based on the weight of the electrically conducting polymeric composition; where the thermoplastic organic polymer is a polyphenylene sulfide, a polyamide, a polyester, a polycarbonate, or a polycarbonate-acrylonitrile-butadiene-styrene blend; and
    an electrically insulating composition; the electrically insulating composition comprising glass fibers; with the aspect ratio of the glass fibers being greater than 1; the glass fibers being present in amounts of about 5 to about 30 wt %, based on the weight of the electrically conducting polymeric composition; wherein the electrically conducting polymeric composition has a flexural modulus of greater than or equal to about 4 gigapascals and a melt flow index of about 5 to about 100 when measured under a load of 10 kg-f/cm², the composition having an electromagnetic shielding capability of about 40 to about 80 dB for a sample having a thickness of about 3 millimeters; wherein the metal fibers are stainless steel fibers, copper fibers, nickel fibers, copper alloy fibers, or a combination comprising at least one of the foregoing fibers.

2. The electrically conducting polymeric composition of claim 1, wherein the organic polymer composition comprises amorphous polymers, semi-crystalline polymers, or a combination of amorphous polymers and semi-crystalline polymers.

3. The electrically conducting polymeric composition of claim 1, wherein the organic polymer composition is present in an amount of about 50% to about 90% wt % of the total weight of the electrically conducting polymeric composition.

4. The electrically conducting polymeric composition of claim 1, wherein the metal coated fibers are coated with metals, wherein the metals are copper, aluminum, iron, nickel, cobalt, tin, zinc, gold, silver, platinum, palladium, or a combination comprising at least one of the foregoing metals.

5. The electrically conducting polymeric composition of claim 1, wherein the metal fibers are stainless steel fibers.

6. The electrically conducting polymeric composition of claim 1, wherein the metal fibers have diameters of about 0.5 to about 50 micrometers and average lengths of about 0.5 to about 3 millimeters; the average lengths being measured after processing in an extruder.

7. The electrically conducting polymeric composition of claim 1, wherein the electrically insulating composition has an electrical resistivity that is greater than or equal to about $10^{12}$ ohm-cm.

8. The electrically conducting polymeric composition of claim 1, wherein electrically insulating composition further comprises fibers having an average aspect ratio of greater than 1.

9. The electrically conducting polymeric composition of claim 8, wherein the fibers are silicon carbide fibers, silicon nitride fibers, or a combination comprising at least one of the foregoing fibers.

10. The electrically conducting polymeric composition of claim 1, wherein the electrically insulating composition further comprises particles having an average aspect ratio of about 1; the particles being mica, clay, talc, or a combination comprising at least one of the foregoing particles.

11. The electrically conducting polymeric composition of claim 1, having an electrical resistivity of less than or equal to about $10^5$ ohm-cm.

12. An article manufactured from the composition of claim 1.

13. A method of manufacturing an electrically conducting polymeric composition comprising:
blending an organic polymer composition that comprises a thermoplastic organic polymer; an electrically conducting filler composition that comprises metal fibers, metal coated fibers, or a combination comprising at least one of the foregoing metal fibers and the metal coated fibers; with the aspect ratio of the metal fibers and the metal coated fibers being greater than 1; the electrically conducting filler being present in amounts of about 3 to 30 wt %, based on the weight of the electrically conducting polymeric composition; where the thermoplastic organic polymer is a polyphenylene sulfide, a polyamide, a polyester, a polycarbonate, or a polycarbonate-acrylonitrile-butadiene-styrene blend; and an electrically insulating composition;
the electrically insulating composition comprising glass fibers; with the aspect ratio of the glass fibers being greater than 1; the glass fibers being present in amounts of about 5 to about 30 wt %, based on the weight of the electrically conducting polymeric composition; wherein the electrically conducting polymeric composition has a flexural modulus of greater than or equal to about 4 gigapascals and a melt flow index of about 5 to about 100 when measured under a load of 10 kg-f/cm$^2$, the composition having an electromagnetic shielding capability of about 40 to about 80 dB for a sample having a thickness of about 3 millimeters; wherein the metal fibers are stainless steel fibers, copper fibers, nickel fibers, copper alloy fibers, or a combination comprising at least one of the foregoing;
wherein the electrically insulating composition is fed into the extruder downstream of the location at which the organic polymer composition is fed into the extruder and wherein the electrically conducting filler composition is fed into the extruder at a location downstream of the location at which the electrically insulating composition is fed into the extruder.

14. The method of claim 13, wherein the blending comprises melt blending.

15. The method of claim 13, further comprising injection molding the electrically conducting polymeric composition.

16. The method of claim 13, wherein the electrically conducting filler composition is fed into the extruder at a point just prior to the die of the extruder.

17. An article manufactured by the method of claim 13.

* * * * *